Oct. 14, 1924.

L. MENG

BAND BRAKE

Filed June 23, 1924

1,511,627

Leander Meng,
Inventor

By Clarence A. O'Brien
Attorney

Patented Oct. 14, 1924.

1,511,627

UNITED STATES PATENT OFFICE.

LEANDER MENG, OF GENOA, OHIO.

BAND BRAKE.

Application filed June 23, 1924. Serial No. 721,767.

*To all whom it may concern:*

Be it known that I, LEANDER MENG, a citizen of the United States, residing at Genoa, in the county of Ottawa and State of Ohio, have invented certain new and useful Improvements in a Band Brake, of which the following is a specification.

This invention relates to band brakes and it consists in the novel features hereinafter described and claimed.

An object of the invention is to provide a brake of the character stated which is of simple and durable structure and having its parts so arranged and assembled that the band sections will effectually engage the drum of the brake when applied and will not ride upon the drum of the brake when the brake is released.

With this object in view the structure includes a disc having semi-circular brake band sections located at the periphery thereof, there being provided upon the disc spaced arms with threaded posts journaled therein. The threads at the opposite end portions of the post are oppositely disposed and engaged with the end portions of the band sections, means are provided for swinging the posts simultaneously whereby the brake band sections are drawn toward the disc when the brake is applied and are simultaneously moved away from the disc when the brake is released.

In the accompanying drawing:—

Figure 1:
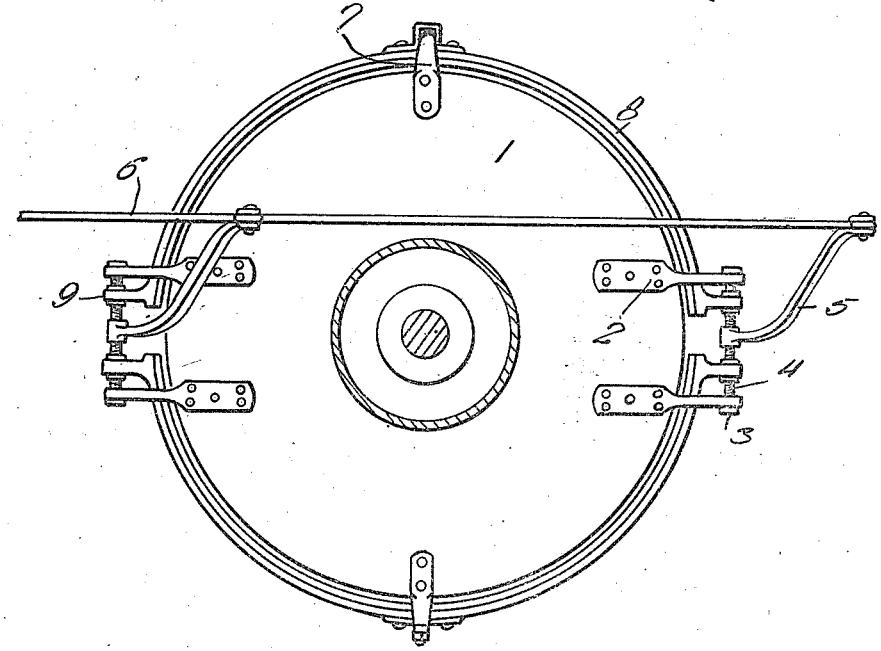
Figure 1 is a side elevation of a band brake structure.
Figure 2:
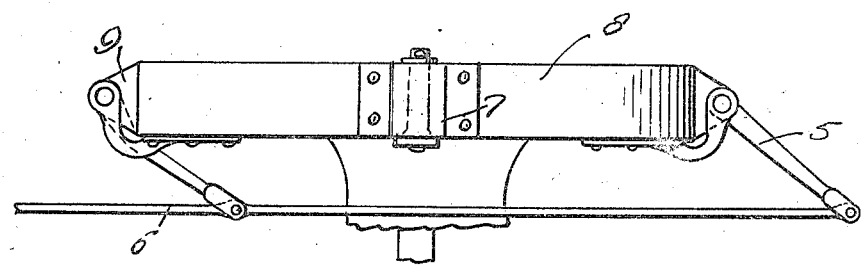
Figure 2 is a top plan view thereof.

The band brake structure comprising a disc 1 having spaced arms 2 mounted thereon, posts 3 are journaled in the end portions of the arms 2 and bridge the spaces between said arms at the same side of the disc. The posts 3 are provided at their intermediate portions with oppositely disposed threads 4. Arms 5 are connected with the intermediate portions of the posts 3 and a bar 6 is pivotally connected with the said arms and disposed across the face of the disc 1.

Figure 3:
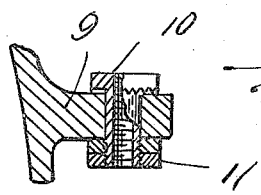
Figure 3 is a detail sectional view of a collar and lock nut used in the band brake structure.

Lugs 7 are mounted upon the upper and lower portions of the disc 1 and brake band sections 8 are connected at points between their ends with the lugs 7. The sections 8 are provided at their ends with outstanding lugs 9 which carry collars 10, lock nuts 11 being applied to the said collars and serving to hold them securely in the lugs 9 and as best indicated in Figure 3 of the drawing. The posts 3 are journaled in the collar 10.

It will be seen that when the bar 6 is moved longitudinally, the arms 5 are swung whereby the posts 3 are turned and in that the threads 4 engage the threads in the interior of the collars 10, the lugs 9 and brake band sections 8 are moved with relation to the disc 1. When the rod 6 is moved in one direction the sections are moved toward the disc 1 and when the rod 6 moves in an opposite direction, the sections 8 are moved away from the disc 1. Therefore it will be seen that when the brake is released, the brake band sections 8 will be spaced from the brake drum and will not ride upon the drum.

Having thus described the invention, what I claim is:—

1. A band brake structure comprising a disc, spaced arms mounted thereon, threaded posts journaled in the arms, means for turning the posts simultaneously, collars threaded upon the post and brake band sections having lugs which carry the collars.

2. A brake band structure comprising a disc, spaced arms mounted thereon, posts journaled in the arms, the posts being threaded in opposite directions at their opposite end portions, means for turning the posts simultaneously, brake band sections mounted upon the disc and having lugs, collars passing through the lugs, means for locking the collars with relation to the lugs, said collars being internally threaded and engaging the threads upon the posts.

In testimony whereof I affix my signature.

LEANDER MENG.